Patented Feb. 7, 1928.

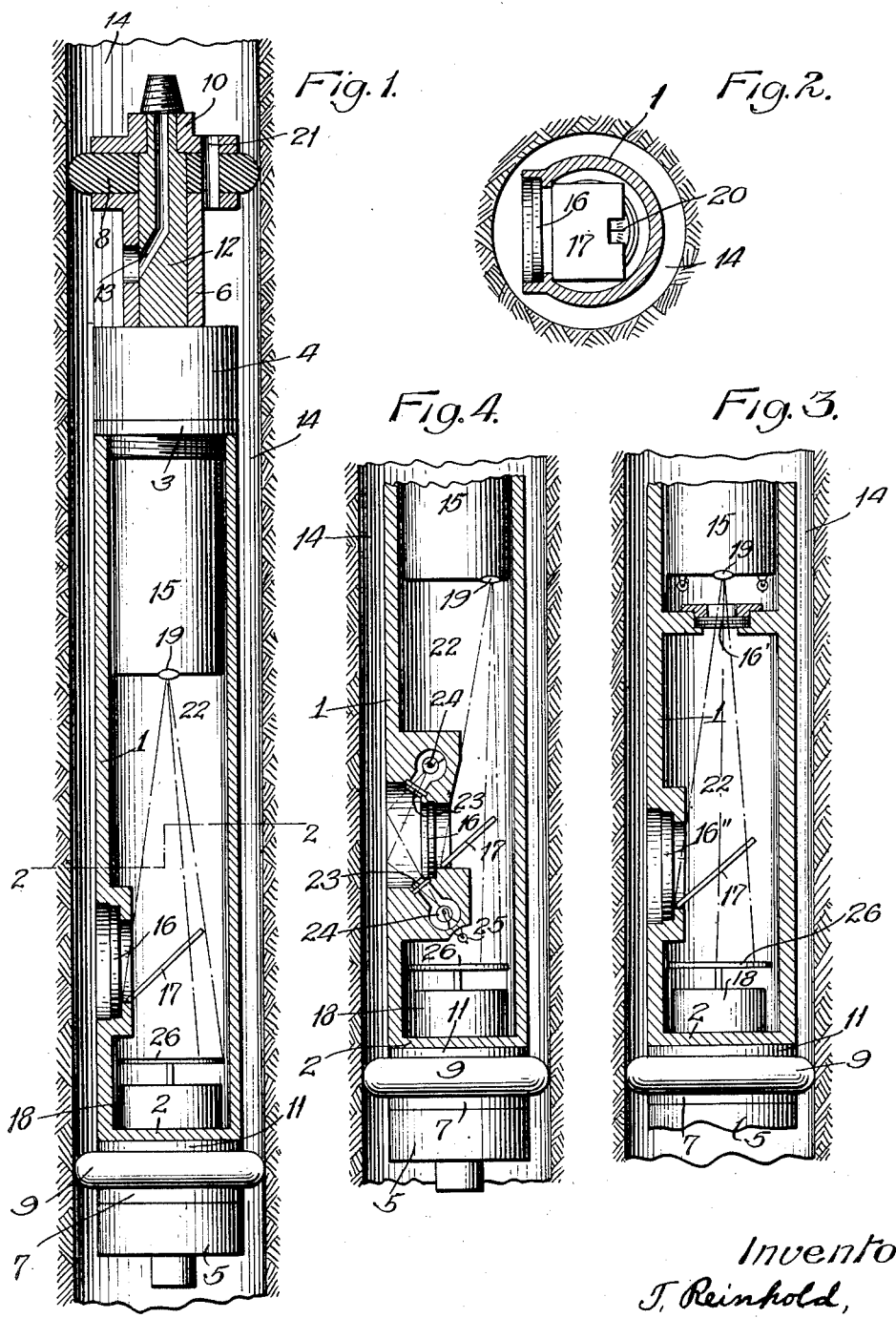

1,658,537

UNITED STATES PATENT OFFICE.

THOMAS REINHOLD, OF HAARLEM, NETHERLANDS.

STRATIGRAPHIC MEASURING INSTRUMENT.

Application filed March 20, 1924, Serial No. 700,729, and in the Netherlands March 29, 1923.

The object of the present invention is to provide a photographic measuring instrument for ascertaining the direction of the bend or inclination of stone, rock or gneiss in drilled bore holes for the purpose of obtaining the required data concerning the course of the strata. With the hitherto known instruments it was impossible to obtain exact information as to the course of the strata.

With this end in view a certain length of the bore hole is, according to the invention, first closed in a watertight manner at the upper and lower ends by means of the instrument. This separated length or portion of the bore hole is then washed or cleaned with pure water so that the photographic apparatus contained within the instrument is surrounded by clear and clean water. A photographic view is then taken of a part of the wall of the bore hole by the aid of electric illumination, and at the same time the direction of the compass needle of a magnetic or gyroscopic compass contained within the instrument is taken upon the same photographic plate.

By taking a series of photographs in various directions, the bend or inclination of the stratum of the drilled stone, rock or gneiss may be ascertained, and by taking simultaneously the corresponding directions or positions of the compass card during the various takings of the bore hole wall the direction of the bend or inclination of the strata may be determined.

One construction of the stratigraphic instrument embodying the features of the invention is shown by way of example in the accompanying drawing in which Fig. 1 is a longitudinal section of the instrument and the bore hole, Fig. 2 a cross section on line 2—2 of Fig. 1, Fig. 3 a longitudinal section through a modified construction employing a horizontal closure device and Fig. 4 a longitudinal section illustrating a different arrangement of the electric lamps.

The stratigraphic instrument forming the subject of the invention comprises a tubular casing 1 having a bottom 2 and adapted to be closed at the top end by means of a screw closure 3. Above the closure 3 and below the bottom 2 are provided cylindrical chambers 4 and 5 for the reception of pressure producing means. Piston rods 6 and 7 are adapted to move up and down through the covers or heads of the chambers 4 and 5 said piston rods 6 and 7 being adapted to exert pressure upon rubber packing rings 8 and 9 respectively which rest with their upper surfaces against stationary plates 10 and 11 respectively. The upper rod 6 is guided in a cylindrical casing 12 and serves also for the admission of water, a water passage 13 being provided in the rod 6 which opens below the packing ring 8 and communicates with the annular space between the tubular casing 1 and the internal wall of the bore hole 14. Below the screw closure 3 and within the cylindrical chamber 22 of the casing is provided a photographic apparatus 15 the lens 19 of which is downwardly directed.

In the wall of the tubular casing 1 there is provided an opening closed in a watertight manner by a small transparent disc 16. An inclined mirror 17 is placed in the space 22 behind the disc 16. A magnetic or gyroscopic compass 18 is placed upon the bottom 2 of the casing 1. This compass is partly covered as regards the rays coming from the photographic apparatus by the mirror 17.

The disc 16 which in the construction shown is arranged in the vertical wall of the tubular casing 1 and closes hermetically the cylindrical space 22 against the bore hole 14, may as shown in Fig. 3 be arranged horizontally immediately below the lens 19 of the photographic apparatus. It will be seen that in Fig. 3 the disc 16' through which the rays pass may be very small and thus withstand very high pressures. In the construction of Fig. 3 the space 22 below the disc 16' is filled with water. The disc 16" arranged in the vertical wall of the tubular casing 1 is not intended to effect a watertight closure and is therefore not subjected to high pressure. It may be made very thin and serves only for preventing the entrance of dirty water into the space 22. The water round the mirror 17 should be clear as otherwise it would detrimentally affect the action of the apparatus.

In the construction shown in Fig. 1 the wall of the bore hole is illuminated by electric incandescent lamps arranged inside the casing 1 laterally of the mirror 17. It is preferred, however, to arrange the source of light in the manner shown in Fig. 4. According to Fig. 4 the electric lamps 24 or other sources of light for illuminating the wall of the bore hole to be photographed throw the light through the watertight transparent closing discs 23. The reflected rays pass through the watertight closing disc 16 to the lens 19. In this manner detrimental reflection is avoided and the photographic views are much sharper than in the case in which both the direct and the reflected rays have to pass through the same disc 16. If electric lamps of a particular construction are used the discs 23 may be entirely dispensed with. In the construction shown in Fig. 4 the compass is illuminated by a separate lamp 25.

In the construction according to Fig. 3 in which the transparent closing disc 16' is arranged directly below the lens 19, the electric lamps are arranged between the lens 19 and the disc 16'.

The mirror 17 is provided at its upper edge with a cut-out portion 20 (see Fig. 2) through which the rays can pass from above to the compass card 26.

The operation is as follows:

The instrument is lowered within the bore hole 14 to the required depth at which the direction and inclination of the various strata of the rock are to be ascertained. The means contained in the chambers 4 and 5 for producing pressure are then brought into action whereby the rods 6 and 7 are caused to compress the rubber packing rings 8 and 9. If desired the rings might be compressed by pressure water taken from the pipe which supplies the scavenging water during the drilling operation. The rings 8 and 9 are expanded by the pressure and are caused to lie tightly against the bore hole whereby the length of the bore hole 14 between the rings 8 and 9 is practically separated from the remaining length of the bore hole. After the length of the bore hole within which the photographic view is to be taken has thus been separated, clean scavenging or wash water is admitted by way of the passage 13, and the bore hole section 14 round the instrument is cleaned, the water escaping through a passage 21 provided in the ring 8 and the disc 10. When the water in the space 14 is sufficiently clean and clear so as not to impede the photographic operation, the electric lamps are switched in and the apparatus 15 is brought into action. In this manner a photographic view of the part of the bore hole wall visible through the disks 16 or 16'' is taken by the aid of the mirror 17. At the same time a part of the compass card visible through the cut-out portion 20 is taken upon the same plate. It will thus be seen that a view of a part of the bore hole is taken and at the same time a photographic record is made of the direction in which the view was taken. The photographic view gives the inclination of the various strata of the drilled rock, whilst the position of the compass card indicates the direction in which the strata extend.

If a series of such views is taken at definite angular positions of the instrument, exact information may be obtained as regards stratification of the rock, the inclination of the strata and the directions in which the strata runs.

I claim:

1. An instrument arranged to be lowered into a bore hole, comprising a camera for photographing a portion of the wall of the bore hole at the level to which the instrument is lowered, and means for indicating on the photograph the geographical direction from the center of the bore of the surface photographed.

2. A stratigraphic measuring instrument, comprising a closed tubular casing adapted to be inserted into a bore hole, a photographic camera arranged within said casing, an inclined mirror arranged within said casing for reflecting an image of a portion of a bore hole wall into the camera, a compass within said casing below the mirror arranged in such a manner as to be capable of throwing an image of said compass into the camera, and means for illuminating the wall of the bore hole opposite the mirror and the compass.

3. A stratigraphic measuring instrument, comprising a closed tubular casing adapted to be inserted into a bore hole, a photographic camera arranged within said casing, an inclined mirror arranged within said casing and adapted to reflect images from the wall of said bore hole to said camera, a transparent disc fitted into the wall of the casing in front of said mirror, a compass below the mirror in the range of the camera, and an electric lamp arranged within said casing laterally of the disc and adapted to illuminate the wall of the bore hole situated opposite the disc as well as the compass.

4. A stratigraphic measuring instrument, comprising a closed tubular casing adapted to be inserted into a bore hole, a photographic camera arranged within said casing, an inclined mirror arranged within said casing in the range of the camera and having a cutaway portion, a transparent disc arranged in the wall of the tubular casing in front of said mirror, a compass in the casing below the camera and exposed thereto through the cutaway portion of the mirror, and means for illuminating the portion of the wall of the bore hole in front of the disc as well as the compass, substantially as described.

In testimony whereof I have hereunto set my hand.

THOMAS REINHOLD.